Dec. 22, 1953     E. V. DETTMER     2,663,350
HEAT AND PRESSURE ELEMENT FOR WELDING THERMOPLASTIC FILMS
Filed Jan. 2, 1952

INVENTOR
Edward V. Dettmer

BY     Griswold & Burdick
ATTORNEYS.

Patented Dec. 22, 1953

2,663,350

UNITED STATES PATENT OFFICE 2,663,350

HEAT AND PRESSURE ELEMENT FOR WELDING THERMOPLASTIC FILMS

Edward V. Dettmer, Bay City, Mich., assignor to The Dow Chemical Company, Midland, Mich., a corporation of Delaware Application January 2, 1952, Serial No. 264,615

3 Claims. (Cl. 154—1)

This invention relates to an improved heating element for use in pressing against plural thicknesses of thermoplastic films and heating them to produce a weld or seal in overlapped portions of the film.

Various machines are known for sealing thermoplastic films together, and these are being used widely in packaging operations. One such machine is shown by Lowry and Church in U. S. 2,469,972 and another is disclosed by Rohdin in U. S. 2,392,695. The former operates continuously, seizing and holding the films between smooth metal belts, under pressure, and conveying the films past heating elements. The machine of the latter patent operates intermittently, the films being interposed between cloth or wire mesh belts and heat being applied through the belts by hot "jaws." For reasons to be stated, it is desired to provide a heating element, for use in contact with the films, which avoids some of the principal difficulties heretofore encountered. It is desirable to avoid the use of hot, highly polished metal surfaces in the sealing operation, as the fused plastic is too prone to adhere to such surfaces. Rougher surfaces tend to avoid adherence to the film, but those used heretofore leave the sealed area with a scuffed or abraded surface, if the film is drawn past such a surface while still hot. Machines of the types mentioned are not adapted to sealing the folded end flaps across the flat faces of packages such as cereal boxes or the more yieldable packages such as wrapped bread, since, in such operations, heat can be applied from but one side of the overlapped film. It is the object of this invention to provide a film welding element whose use will avoid the above mentioned difficulties.

According to the present invention, the said desired results are obtained through the provision and use of a particular type of film-contacting surface on the heating element used for welding thermoplastic films. The face of such an element in contact with the film to be welded is composed of wire mesh of such construction that most, and preferably all, of the wires contacting the film are parallel to one another and are preferably aligned in the direction of movement of the film through the machine. The heating element is provided with an internal reservoir of oily lubricant, and with channels through which said lubricant is fed to the wire mesh surface at a rate sufficient to maintain at that surface a liquid film of the lubricant. As a result, the film does not stick to the surface, even though the latter feels smooth, and is not scuffed or abraded by that surface, even though it appears to be somewhat rough due to its woven condition. When heat is applied to the film (under pressure, where practical), and the film is then released, a good, smooth weld is obtained.

The invention will be described more in detail with reference to the accompanying drawing wherein.

Figure 4:
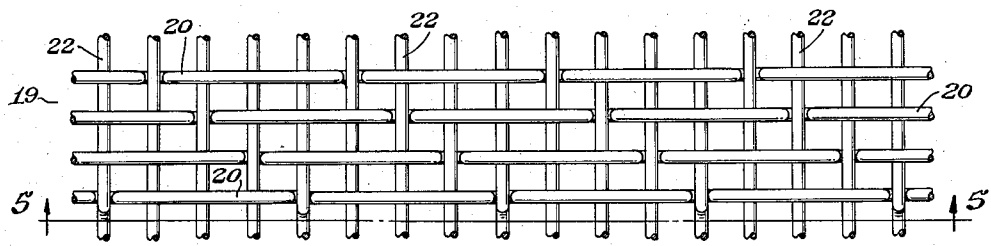
Fig. 4 is a plan view of one type of woven wire screen suitable for use as the working face of the heating element; and, Fig. 5 is a longitudinal section through such screen, taken along line 5—5 of Fig. 4. Throughout the drawing, the spacing of the various members of the assembly is exaggerated, for clarity.
Figure 5:
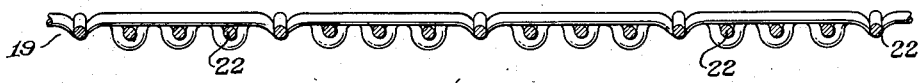
Figure 1:
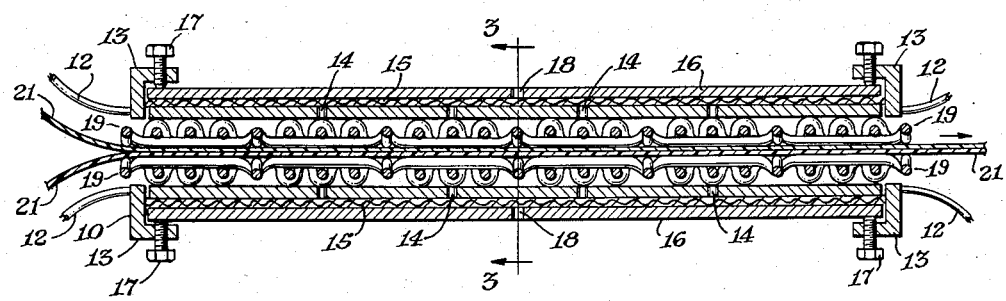
Fig. 1 is a longitudinal section through one form of a pair of the heat and pressure members of the invention, with a pair of films to be welded shown as interposed between the pair of welding elements.
Figure 2:
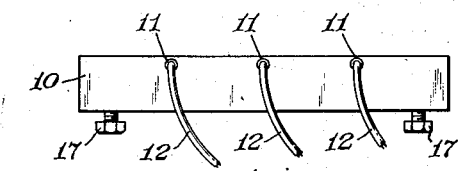
Fig. 2 is an end view of one of the heating elements of Fig. 1.
Figure 3:
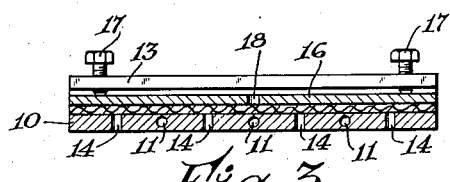
Fig. 3 is a cross-section of one of the heating elements, taken along line 3—3 of Fig. 1.

The heating elements of the invention comprise a dense metal body member 10, of high thermal capacity, longitudinally drilled to provide sockets 11 for insertion of electric resistance heaters, the lead wires 12 of which are shown in Figs. 1 and 2. Body 10 is provided with rearwardly extending brackets 13. A plurality of fine channels 14 is provided through body 10 for passage of lubricant from the rear to the face of that body. One or a plurality of sheets of fabric 15, or other wicking material, is positioned to the rear of body member 10, and is held in place by cover plate 16 which, in turn, is positioned within brackets 13 and may be pressed firmly enough against the lubricant containing wicking 15 by means of pressure screws 17, to maintain a film of oil on screen 19. The lubricant content of the confined wicking 15 can be maintained or replenished through ports 18 provided in cover plates 16. There is stretched across the face of body member 10 a woven wire screen 19 in which the only elements lying in the exposed plane are parallel to one another, and are preferably the warp members 20 of screen 19 or of a "corduroy" woven screen with no exposed cross members. It is preferred that screen 19 be disposed with the warp members 20 lying in the direction of movement of film 21 past the welding elements. At the points where the weft or cross-members 22 of screen 19 cross the warp members 20 and are visible on the exposed face of screen 19, the warp members 20 are so crimped that the weft strands lie slightly below the plane of that exposed working face, and this relationship is shown most clearly in Fig. 5.

The heating elements of the present invention may be employed in any of several assemblies already known to be useful in welding plastic films. In operation, the heat and pressure members are heated to the required temperature, and sufficient pressure is applied to the lubricant saturated wicking to supply a liquid film of lubricant to the exposed face of the wire mesh. Two or more thicknesses of plastic film to be welded are moved into position between a pair of the heating elements, and the latter are held in contact with the films, under positive pressure, long enough to fuse and weld the films together. The operation may be intermittent, if desired, with the heaters moving together and apart at regular intervals as the films are introduced to the welding zone and become welded. Continuous operation, with the heaters in fixed position, is also possible. In the latter case, a film-wrapped package, or other item requiring a film to film seal, is drawn past one, or between two of the heaters and is moved at a rate which will permit the formation of a weld before the article loses contact with the heater. In either case, there is no tendency for the film to stick to the hot welding element, and no scuffing of the hot film.

The metallic elements of the invention may be made of any metal with high heat capacity. Thus, copper or a copper alloy is the preferred material for the body member 10 and for the screen facing 19, though the latter may be made of any metal which is not catalytically destructive of the film at the temperature employed, and the former, being out of contact with the film, is not so limited.

Numerous plastic films are known which can be welded advantageously with the herein-described apparatus. These include, but are not limited to, vinylidene chloride copolymer films, vinyl chloride-vinyl acetate copolymer films, and rubber hydrochloride films.

I claim:

1. In an apparatus for heat welding plural thicknesses of organic thermoplastic film, a heating element comprising a metallic body of high heat capacity; means for heating said body to a film welding temperature; a woven wire screen attached to and constituting the working face of said body, the warp wires of which constitute most of the exposed surface of the screen; channels through said body communicating with said screen; and means for supplying a liquid lubricant through said channels to the screen.

2. In an apparatus for heat welding plural thicknesses of organic thermoplastic film, a heating element comprising a metallic body of high heat capacity; means for heating said body to a film welding temperature; a woven wire screen attached to and constituting the working face of said body, the warp members of said screen lying parallel to the direction of travel of film through the apparatus and constituting the exposed surface of the screen, and being the only wires to contact films during a welding operation; channels through said body communicating with said screen; and means for supplying a liquid lubricant through said channels to the screen.

3. In an apparatus for heat welding plural thicknesses of organic thermoplastic film, a heating element comprising a metallic body of high heat capacity; means for heating said body to a film welding temperature; a woven wire screen attached to and constituting the working face of said body, the warp wires of which constitute most of the exposed surface of the screen; channels through said body communicating with said screen; oil-absorptive wicking disposed rearwardly of said body in communication with said channels; means for supplying oil to the wicking; and, means for expressing oil at a controlled rate from the wicking to maintain a film of oil on the screen during operation of the apparatus.

EDWARD V. DETTMER.

References Cited in the file of this patent

UNITED STATES PATENTS

| Number | Name | Date |
| --- | --- | --- |
| 1,343,216 | McClain | June 15, 1920 |
| 1,875,055 | Loetscher | Aug. 30, 1932 |
| 2,120,137 | Mason | June 7, 1938 |
| 2,268,477 | Elmendorf | Dec. 30, 1941 |